United States Patent [19]
Hori et al.

[11] Patent Number: 5,222,099
[45] Date of Patent: Jun. 22, 1993

[54] SPREAD SPECTRUM SIGNAL RECEIVING APPARATUS

[75] Inventors: Katsuya Hori; Tadao Yoshida, both of Kanagawa; Wataru Yamatani, Chiba; Eiichiro Morinaga, Tokyo, all of Japan

[73] Assignee: Sony Corporation, Tokyo, Japan

[21] Appl. No.: 821,990

[22] Filed: Jan. 16, 1992

[30] Foreign Application Priority Data

Jan. 21, 1991 [JP] Japan .................................. 3-020456
Jan. 21, 1991 [JP] Japan .................................. 3-020457

[51] Int. Cl.$^5$ ............................................. H04K 1/00
[52] U.S. Cl. ....................................... 375/1; 342/357; 455/12.1
[58] Field of Search ............... 375/1; 380/34; 342/352, 342/357; 455/12.1

[56] References Cited

U.S. PATENT DOCUMENTS

| | | | |
|---|---|---|---|
| 4,112,372 | 9/1978 | Holmes et al. | 375/1 X |
| 4,672,629 | 6/1987 | Beier | 375/1 |
| 4,761,795 | 8/1988 | Beier | 375/1 |
| 4,888,788 | 12/1989 | Teranishi et al. | 375/1 |
| 4,894,841 | 1/1990 | Martinino et al. | 375/1 |

FOREIGN PATENT DOCUMENTS

0099703A2  2/1924  European Pat. Off. .
0351156A1  1/1990  European Pat. Off. .

OTHER PUBLICATIONS

Record of the IEEE Position Location Symposium 1988, Nov. 29, 1988, Kissemmee, Fla., USA; pp. 153-164. Aggarwal: "A state of the art military GPS receiver".

*Primary Examiner*—Tod R. Swann
*Attorney, Agent, or Firm*—Philip M. Shaw, Jr.

[57] ABSTRACT

A spread spectrum signal receiving apparatus comprising: a radio frequency processing circuit for converting a spread spectrum signal into an intermediate frequency signal; a binary encoder for encoding the intermediate frequency signal; a pseudo-random noise code generator; a code driver for controlling the phase and the chip speed of the output of the code generator; a first multiplier for multiplying the binary signal by the output of the code generator; a numerical controlled oscillator for outputting first and second carrier signals; second and third multipliers for multiplying the output signal of the first multiplier respectively by the first and second carrier signals; first and second low-pass filters supplied with the output signals of the second and third multipliers respectively; and a microcomputer having functions to produce signals for controlling the numerical controlled oscillator, and functions to produce signals for controlling the code driver.

6 Claims, 10 Drawing Sheets

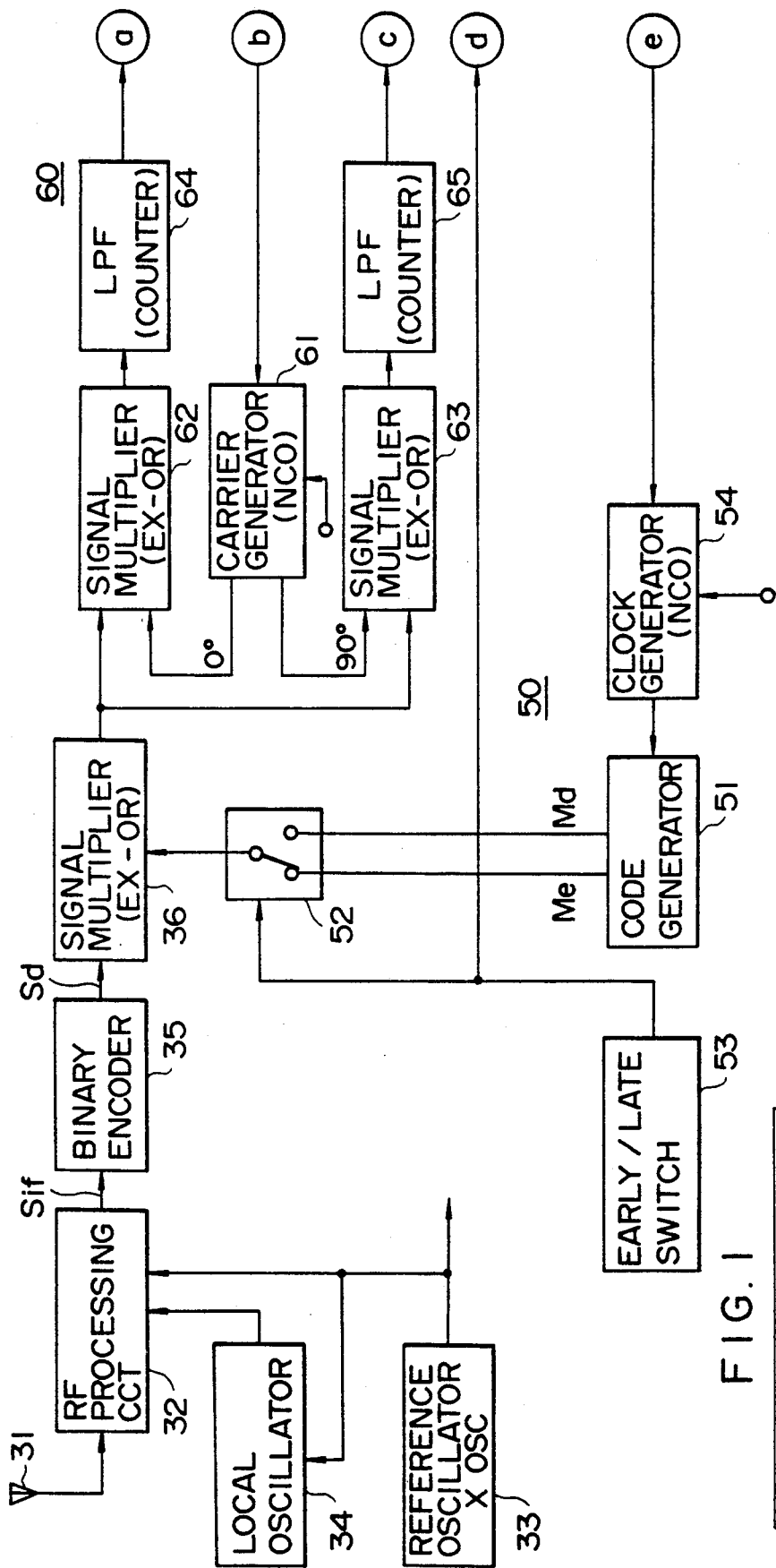

SQUARE-LAW DETECTION

ABSOLUTE-VALUE DETECTION

SPREAD SPECTRUM SIGNAL RECEIVING APPARATUS

BACKGROUND OF THE INVENTION

1. Field of the Invention

The present invention relates to an apparatus for receiving spread spectrum signals such as satellite signals used in a mobile positioning system or the like.

2. Description of the Prior Art

There is known a system for determining the position of a mobile object by utilizing a plurality of artificial satellites which orbit around the earth, and a method of spread spectrum modulation is employed in such system to process satellite signals. For example, in a position determining system termed GPS (global positioning system), a satellite signal is transmitted in a state where 50-bps orbit parameter data (inclusive of orbit data to indicate the time and position of the satellite) are processed by spread spectrum modulation in accordance with a pseudo-random noise code (e.g., GOLD code) having a chip speed of 1.023 Mhz and a period of 1 msec, and two carriers of 1575.42 MHz and 1227.6 MHz are processed by orthogonal phase modulation (two-phase PSK modulation).

A GPS receiver processes input signals received from at least three satellites with follow-up and spectrum inverse spread of the aforementioned carriers to thereby demodulate the orbit parameter data of each satellite, hence obtaining data of the signal arrival time (i.e., the distance between the satellite and the user is found from the satellite signal arrival time) and the satellite position. The position of the user can be determined three-dimensionally from the intersections of spheres plotted with the centers corresponding to the positions of the satellites and the radii corresponding to the measured distances.

FIG. 9 shows an exemplary constitution of a conventional GPS receiver. A signal received at an antenna 1 is supplied to a radio frequency processing circuit 2 where the carrier is converted into an intermediate frequency signal of 10.7 MHz (signal band 10.7 ±1.023 MHz).

The intermediate frequency signal is supplied to a demodulator which will be described below. The demodulator comprises a feedback loop for inverse spread to demodulate the spread spectrum modulation, and another feedback loop for demodulating the two-phase modulation based on orbit parameter data bits.

In this example, the technique known as τ-dither tracking is adopted in the inverse spread demodulating feedback loop. Denoted by 20 is a code generator for generating pseudo-random noise codes on the receiver side, inclusive of an early code Me and a late code Md having a phase difference of the 1-chip time. The early code Me and the late code Md from the code generator 20 are supplied to an early/late code selector 21, which is selectively switched every millisecond by an early/late switch 22 so that a composite pseudo-random noise code is obtained from the code selector 21. The composite pseudo-random noise code thus obtained is then supplied to a balanced modulator 3. And the intermediate frequency signal from the radio frequency processing circuit 2 is supplied to the balanced modulator 3 so that the signal is modulated by the composite pseudo-random noise code.

The code generator 20 is controlled by clock pulses which are produced from a clock generator 23 as a code driver and are controlled in both phase and frequency as will be described later, in such a manner that the phases and the frequencies (chip speeds) of the early and late pseudo-random noise codes Me and Md are rendered coincident with the phase and the frequency (chip speed) of the pseudo-random noise code included in the intermediate frequency signal obtained from the radio frequency processing circuit 2.

The feedback loop for demodulating the data bits is composed of a costas loop in this example. The costas loop comprises a carrier generator 4 consisting of a voltage-controlled variable frequency oscillator (hereinafter referred to as VCO) and a 90° phase shifter, first and second analog multipliers 5 and 6, low-pass filters 7 and 8, a third analog multiplier 9, and a loop filter 10.

First and second carrier signals ($\cos\omega t$ and $\sin\omega t$) of orthogonal phases are obtained from the carrier generator 4 and then are supplied to the first and second multipliers 5 and 6 respectively so as to be multiplied by the inverse-spread intermediate frequency signal $Si = (\pm A\cos(\omega t + \phi))$ obtained from the balanced modulator 3. The outputs of the first and second multipliers 5 and 6 are supplied via the low-pass filters 7 and 8 respectively to the third multiplier 9 so as to be multiplied mutually. The output level of the third multiplier 9 represents the phase difference between the carrier component of the received signal and the carrier produced from the carrier generator 4. The output of the multiplier 9 is supplied via the loop filter 10 to the carrier generator 4 so that the VCO in the carrier generator 4 is controlled for causing the phase of the output carrier signal of the carrier generator 4 to follow up the carrier component in the signal Si.

The outputs ($\pm \frac{1}{2}A\cos\phi$ and $\pm \frac{1}{2}\sin\phi$) of the first and second low-pass filters 7 and 8 in the costas loop are supplied respectively to square-law detectors 11 and 12 where square-law detection is performed. The outputs thereof are then supplied to an adder 13 so as to be added to each other. The output of the adder 13 indicates the level of correlation between the received pseudo-random noise code and the pseudo-random noise code obtained from the code generator 20.

The output of the adder 13 is supplied via an analog switch 14 to an early data holder 15 and a late data holder 16 each consisting of an integrator. The analog switch 14 is changed by a switching signal from the early/late switch 22 in synchronism with a change of the early/late code selector 21. Therefore, when the pseudo-random noise code from the code generator 20 is an early code Me, the correlation level output obtained is stored in the early data holder 15. On the other hand, when the pseudo-random noise code from the code generator 20 is a late code Md, the correlation level output obtained is stored in the late data holder 16.

The correlation level outputs of the early data holder 15 and the late data holder 16 are supplied to a subtracter 17 consisting of a differential amplifier or the like, whereby the difference between the two correlation level outputs is obtained therefrom. This difference output represents the phase error between the received pseudo-random noise code and the pseudo-random noise code from the code generator 20. This difference output is supplied via a loop filter 18 to a VCO in a clock generator 23 which serves as a code driver, so that the output pseudo-random noise code from the code generator 20 is so controlled as to follow up the received pseudo-random noise code as mentioned.

The correlation level output from the adder 13 is supplied to a search/sync detector 19, and the frequency of the output clock signal from the clock generator 23 is widely changed until a predetermined correlation is attained by the detector 19 with respect to the received pseudo-random noise code in the phase locking process for the aforementioned pseudo-random noise code, and also the frequency and the phase of the pseudo-random noise code from the code generator 20 are widely changed to perform a search. Once the predetermined correlation is attained, the search is brought to a halt and thereafter the clock generator 23 is controlled by the output of the loop filter 18.

In the manner described above, the received signal based on spread spectrum modulation is demodulated by the inverse spread feedback loop, while the data bits are demodulated by the costas loop. The demodulated data bit output is obtained from the low-pass filter 7 and then is supplied to a data demodulator (not shown) so that the orbit parameter data is demodulated.

However, the conventional spread spectrum signal receiving apparatus mentioned above requires the balanced modulator 3 for attaining a predetermined correlation to the pseudo-random noise code on the receiver side, hence raising the necessity of an analog circuit technique to keep a proper balance of the balanced modulator 3.

Furthermore, since each of the carrier generator and the clock generator 23 is equipped with a VCO, circuit techniques and circuit elements are required for maintaining a desired linearity of the VCO. Consequently the structure of the receiving apparatus is complicated with another disadvantage of causing an increase in the production cost. In addition, there is a further disadvantage that a dimensional increase of the apparatus is unavoidable.

Besides the above, the parameters of the inverse spread feedback loop and the data bit demodulating feedback loop are numerically fixed by the circuit elements or parts to consequently bring about a problem that the parameters are not easily changeable for control.

OBJECTS AND SUMMARY OF THE INVENTION

It is an object of the present invention to provide an improved spread spectrum signal receiving apparatus adapted to eliminate the above drawbacks by digital high-density integration and application of software.

And another object of the invention resides in providing an improved spread spectrum signal receiving apparatus which is capable of producing a satisfactory correlation level output despite the use of a digital circuit configuration.

According to one aspect of the present invention, there is provided a spread spectrum signal receiving apparatus comprising: a radio frequency processing circuit for converting a spread spectrum signal into an intermediate frequency signal, the spread spectrum signal being such that a carrier thereof is modulated by a pseudo-random noise code; a binary encoder for binary-encoding the intermediate frequency signal supplied from the radio frequency processing circuit; a pseudo-random noise code generator; a code driver for controlling the phase and the chip speed of the output pseudo-random noise code from the pseudo-random code generator; a first multiplier for multiplying the binary signal from the binary encoder by the output pseudo-random noise code obtained from the pseudo-random noise code generator; a numerical controlled oscillator for outputting first and second carrier signals which have a $\pi/2$ phase difference from each other and follow up the frequency-converted carrier included in the intermediate frequency signal; second and third multipliers for multiplying the output signal of the first multiplier respectively by the first and second carrier signals having a $\pi/2$ phase difference from each other; first and second low-pass filters consisting of counters and supplied with the output signals of the second and third multipliers respectively; and a microcomputer equipped with functions for producing, in response to the count outputs of the second and third low-pass filters, control signals for controlling the numerical controlled oscillator in such a manner that the frequency and the phase of the output carrier signal of the numerical controlled oscillator follow up those of the carrier component included in the intermediate frequency signal, the microcomputer further equipped with functions for producing, on the basis of the count outputs, control signals for controlling the code driver in such a manner that the phase of the output pseudo-random noise code from the pseudo-random noise code generator coincides with the phase of the pseudo-random noise code included in the speard spectrum signal.

In the present invention of the constitution mentioned, the received spread spectrum signal is binary-encoded after being converted into an intermediate frequency signal, and both the inverse spread feedback loop and the data bit demodulating feedback loop posterior to such binary encoding are digitalized in configuration. And the control signals for such feedback loops are formed by means of software.

Therefore a balanced modulator used in the conventional apparatus is no longer required, and due to employment of a numerical controlled type variable frequency oscillator, a VCO is not needed to consequently realize an improved spread spectrum signal receiving apparatus of a simplified constitution at low production cost.

The above and other features and advantages of the present invention will become apparent from the following description which will be given with reference to the illustrative accompanying drawings.

BRIEF DESCRIPTION OF THE DRAWINGS

FIGS. 1A and 1B are together a block diagram of an exemplary embodiment representing the spread spectrum signal receiving apparatus of the present invention;

DESCRIPTION OF THE PREFERRED EMBODIMENT

Figure 1B:
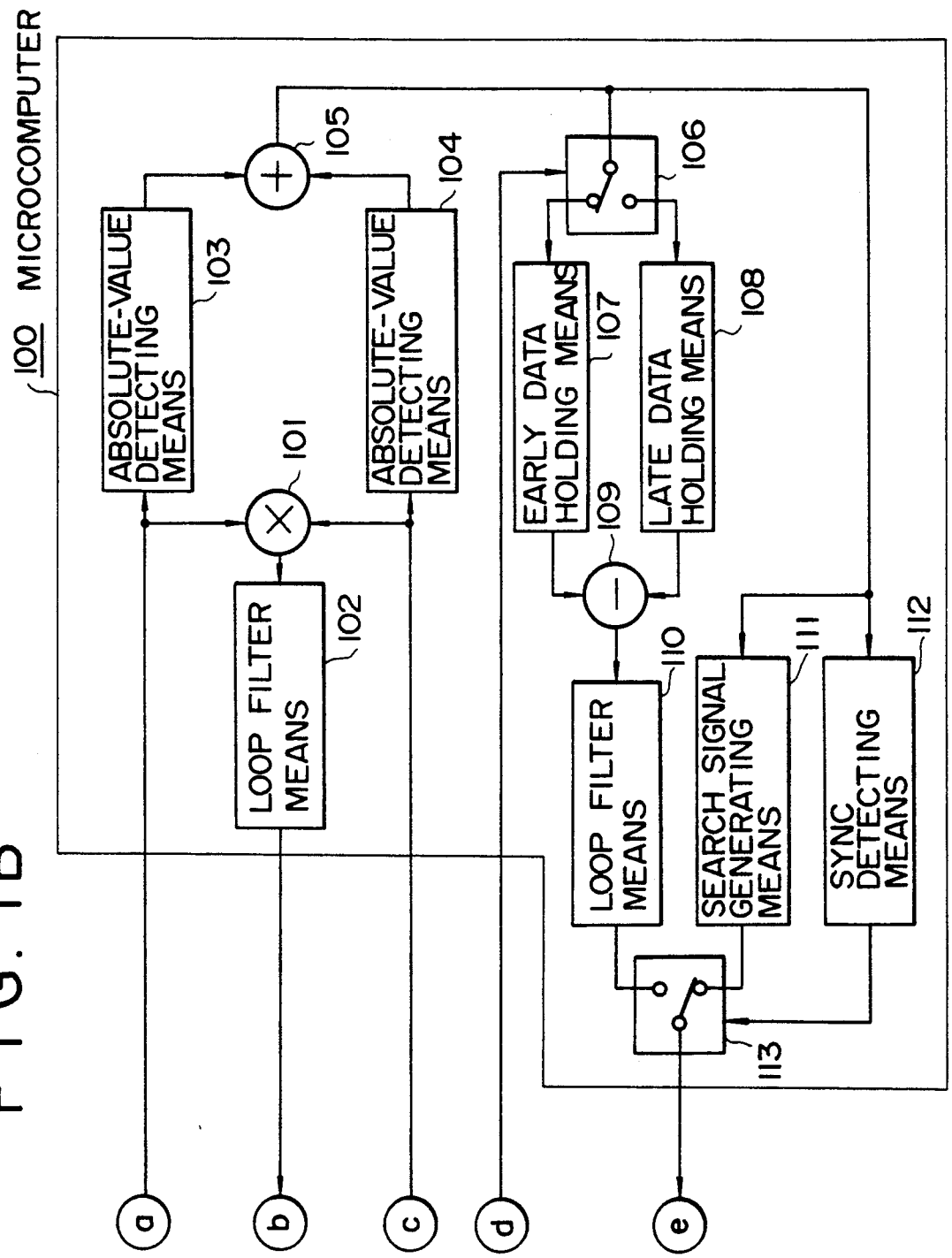

FIG. 1 is a block diagram of a spread spectrum signal receiving apparatus embodying the present invention.

This embodiment represents a receiving apparatus for use in a global positioning system (GPS).

A satellite signal (spread spectrum signal) received at an antenna 31 is supplied to a radio frequency processing circuit 32. Meanwhile an output of a reference oscillator 33 consisting of a 18.414 Mhz quartz oscillator is supplied to a local oscillator 34 which produces a local oscillation output where the output frequency of the reference oscillator and the frequency ratio thereof are fixed.

The local oscillation output thus obtained is supplied to the radio frequency processing circuit 32, where the satellite signal is converted to a signal of a first intermediate frequency 19.437 MHz and then is further converted to a second intermediate frequency signal Sif of a second intermediate frequency 1.023 MHz by the oscillation output of the reference oscillator 33.

The second intermediate frequency Sif obtained from the radio frequency processing circuit 32 is supplied to a binary encoder 35 and is compared with a predetermined threshold level so as to be changed into a binary signal.

The binary output Sd of the binary encoder 35 is supplied to a signal multiplier 36 consisting of an exclusive OR circuit.

In this embodiment also, similarly to the aforementioned conventional example, the technique of τ-dither tracking is used in an inverse spread demodulating feedback loop 50, and a costas loop is employed as a data bit demodulating feedback loop 60. Each of such two loops is formed into a digital circuit configuration, and control signals for the loops are produced by means of software in a microcomputer 100.

The inverse spread demodulating feedback loop 50 includes a code generator 51 for generating pseudo-random noise codes on the receiver side, wherein an early code Me and a late code Md having a phase difference of a 1-chip time are generated. (In the GPS satellite signal, 50-bps orbit parameter data are processed by spread spectrum modulation in accordance with a pseudo-random noise code having a chip speed of 1.023 Mhz and a period of 1 msec.)

The early code Me and the late code Md from the code generator 31 are supplied to an early/late code selector 52, which is changed every millisecond by a switching signal from an early/late switch 53 so that a composite pseudo-random noise code is obtained from the code selector 52. Thereafter the composite pseudo-random noise code is supplied to the multiplier 36 where the noise code is multiplied by the binary intermediate frequency signal Sd obtained from the binary encoder 35.

In this example, a clock 54 for generating a drive clock signal to control the phase and the frequency (chip speed) of the output code from the code generator 51 consists of a numerical-controlled variable frequency oscillator (hereinafter referred to as NCO). A reference clock signal is supplied from the reference oscillator 33 to the clock generator 54, which then produces from the reference clock signal a drive clock signal for controlling the code generator 51 under control of a microcomputer.

In the code generator 51, the phase and the frequency of the early and late pseudo-random noise codes are controlled by the clock signal of the controlled phase and frequency obtained from the clock generator 54. Consequently the pseudo-random noise code outputted from the code generator 51 is so controlled as to coincide with the phase and frequency of the pseudo-random noise code included in the intermediate frequency signal Sd obtained from the binary encoder 45, whereby inverse spread is performed.

The costas feedback loop 60 for demodulating the data bits comprises a carrier generator 61 consisting of an NCO and a 90° phase shifter, first and second multipliers 62 and 63 each consisting of an exclusive OR gate, low-pass filters 64 and 65, and a microcomputer 100 for producing control signals for the carrier generator 61. The carrier generator 61 is supplied with the reference clock signal from the reference oscillator 33 and generates a carrier signal in response to the reference clock signal under control of the microcomputer 100.

The microcomputer 100 executes, by the use of program software, the individual functions shown as function blocks in FIG. 1. Now the processing functions of the microcomputer 100 will be described in detail below with reference to the function blocks in FIG. 1. A multiplying means 101 serves to multiply the counted values of the low-pass filters 64 and 65 each consisting of a counter, thereby producing an output which corresponds to the phase difference between the carrier component in the received signal and the carrier obtained from the carrier generator 61. A loop filter means 102 forms a signal for controlling the carrier generator 61 from the output of the multiplying means 101 and supplies the signal to the carrier generator 61. The above means partially constitute the costas loop 60.

Absolute-value detecting means 103 and 104 respectively detect the absolute values of the count outputs from the low-pass filters 64 and 65, and the detection outputs are added to each other in an adding means 105. The adding means 105 produces a signal indicating the level of correlation between the pseudo-random noise code from the code generator 51 and the pseudo-random noise code in the received signal. With regard to the outputs of the low-ass filters 64 and 65, absolute-value detection is performed instead of square-law detection on the basis of the following reason.

Figure 2A:
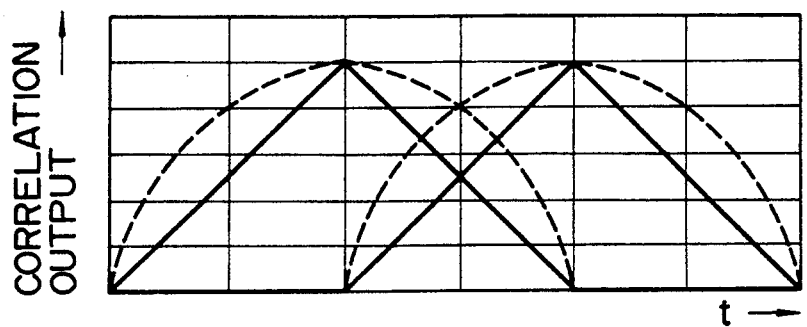
FIGS. 2A through 2C graphically show level outputs of the correlation between a pseudo-random noise code in a received signal and a pseudo-random noise code on a receiver side.
Figure 2B:
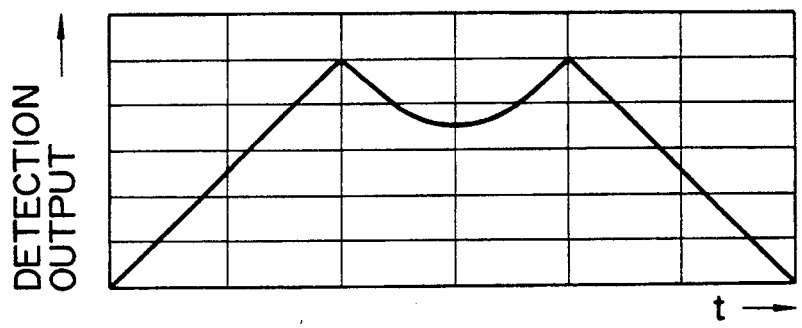
Figure 9:
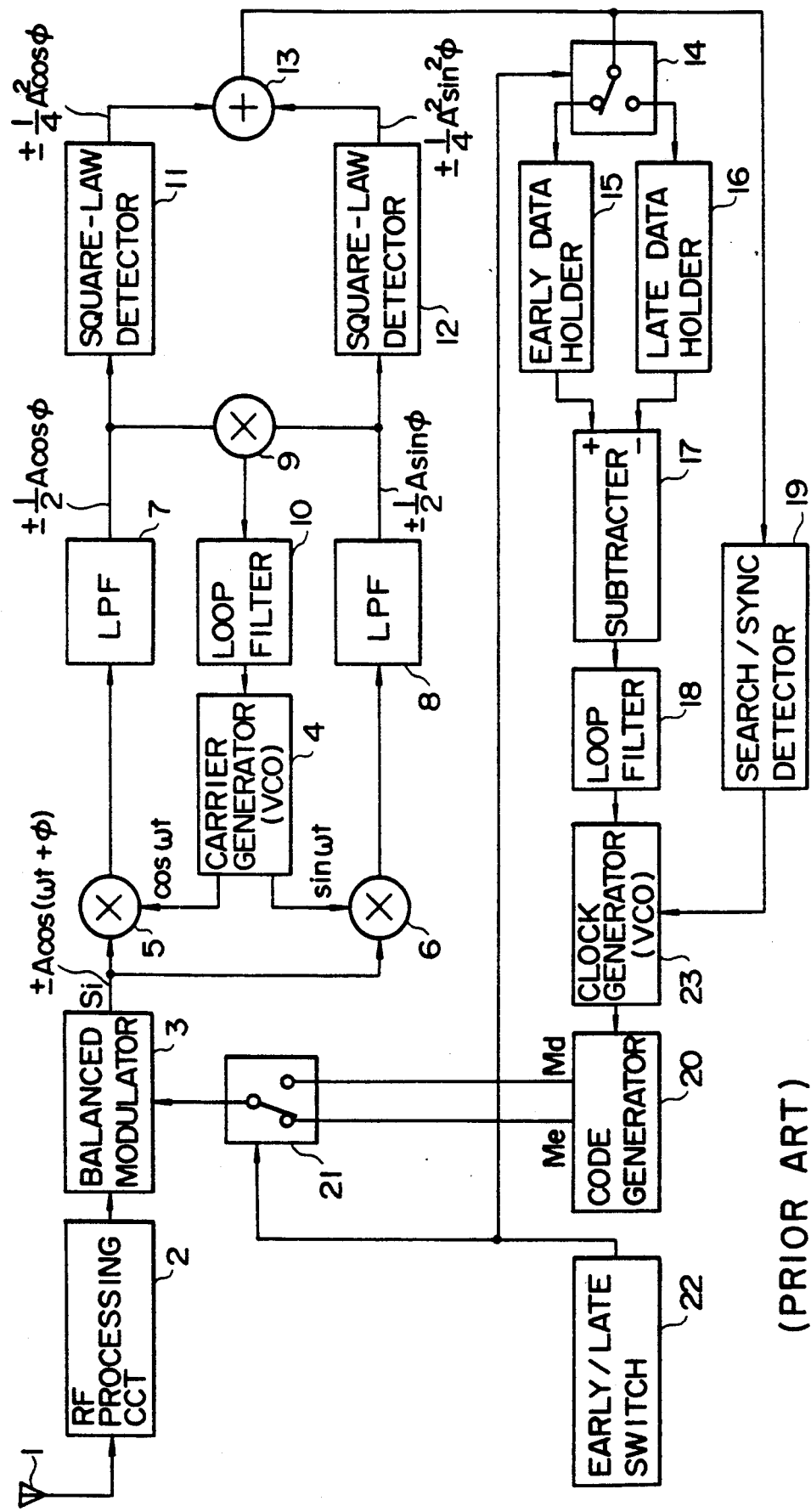
FIG. 9 is a block diagram of a conventional spread spectrum signal receiving apparatus.

In the conventional analog constitution of FIG. 9, the outputs of the low-pass filters 7 and 8 have a relationship of a cosine wave and a sine wave as represented by broken lines (a) and (b) respectively in FIG. 2A when the aforementioned correlation is attained between them. Therefore, if the two outputs are added to each other after square-law detection, it follows that a signal of a fixed level can be obtained. In this embodiment, however, the outputs of the low-pass filters 64 and 65 are binary signals. Accordingly the correlated outputs of the low-pass filters 64 and 65 are triangular waves as represented by solid lines (c) and (d) in FIG. 2A when the aforementioned correlation is attained between them. Therefore, if the outputs of the low-pass filters 64 and 65 are added to each other after square-law detection as in the known example, the level of the added output fails to be fixed regardless of the predetermined correlation as shown in FIG. 2B, and it becomes impossible to discriminate between attainment and nonattainment of the correlation.

Figure 2C:
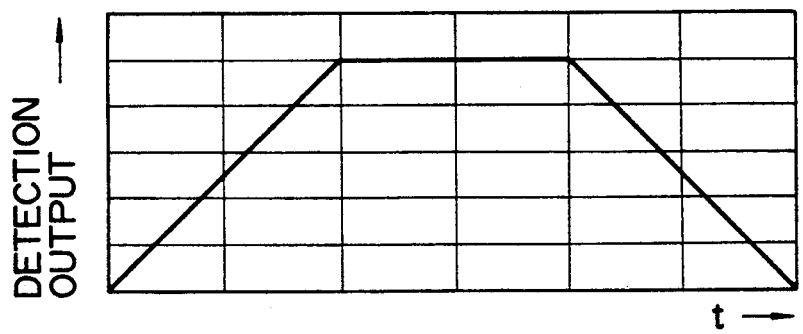

In contrast therewith, the added output obtained after absolute-value detection as in this embodiment has a fixed level as shown in FIG. 2C, whereby an exact discrimination is rendered possible as to whether the proper correction is attained or not.

The output of the adding means 105 is fed to a switch means 106 and is changed by a switching signal from the early/late switch 53 in synchronism with the selector 52, so that the switched output is stored in an early data holding means 107 or a late data holding means 108. Substantially the switch means 106 is not required. In this case, a memory area for the early data and a memory area for the late data are selected in response to the switching signal from the early/late switch 53, and such early data and late data are stored in the selected regions respectively. The output of the early data holding means 107 and that of the late data holding means 108 are supplied to a subtracting means 109 where a subtraction of the two outputs is executed. And the result of such subtraction is supplied to a loop filter means 110, which then forms a numerical control signal for controlling the phase of the drive clock signal outputted from the clock generator 54 for the code generator 51.

The output of the adding means 105 is supplied to a search signal generating means 111 while being supplied also to a sync signal detecting means 112. The search signal generating means 111 generates a search signal to perform a search in such a manner as to slide the output code of the code generator 51 by one period until the predetermined correlation is attained. The sync signal detecting means 112 keeps monitoring the added output and supplies a switching signal to a switch means 113 which alternatively determine a search or a phase control in accordance with the output of the loop filter 110 and selects either the output of the search signal generating means 111 or the output of the loop filter means 110. The output of the switch means 113 is supplied to the clock generator 54.

Hereinafter the practical processes of the microcomputer 100 will be described with reference to flow charts of FIGS. 3 through 7 where reference numerals of the function means correspond to those used in FIG. 1. The operation shown in FIGS. 3 through 7 is repeated every millisecond corresponding to the chip speed of the pseudo-random noise code. Therefore the low-pass filters 64 and 65 each having a counter configuration are reset every millisecond.

Figure 3:
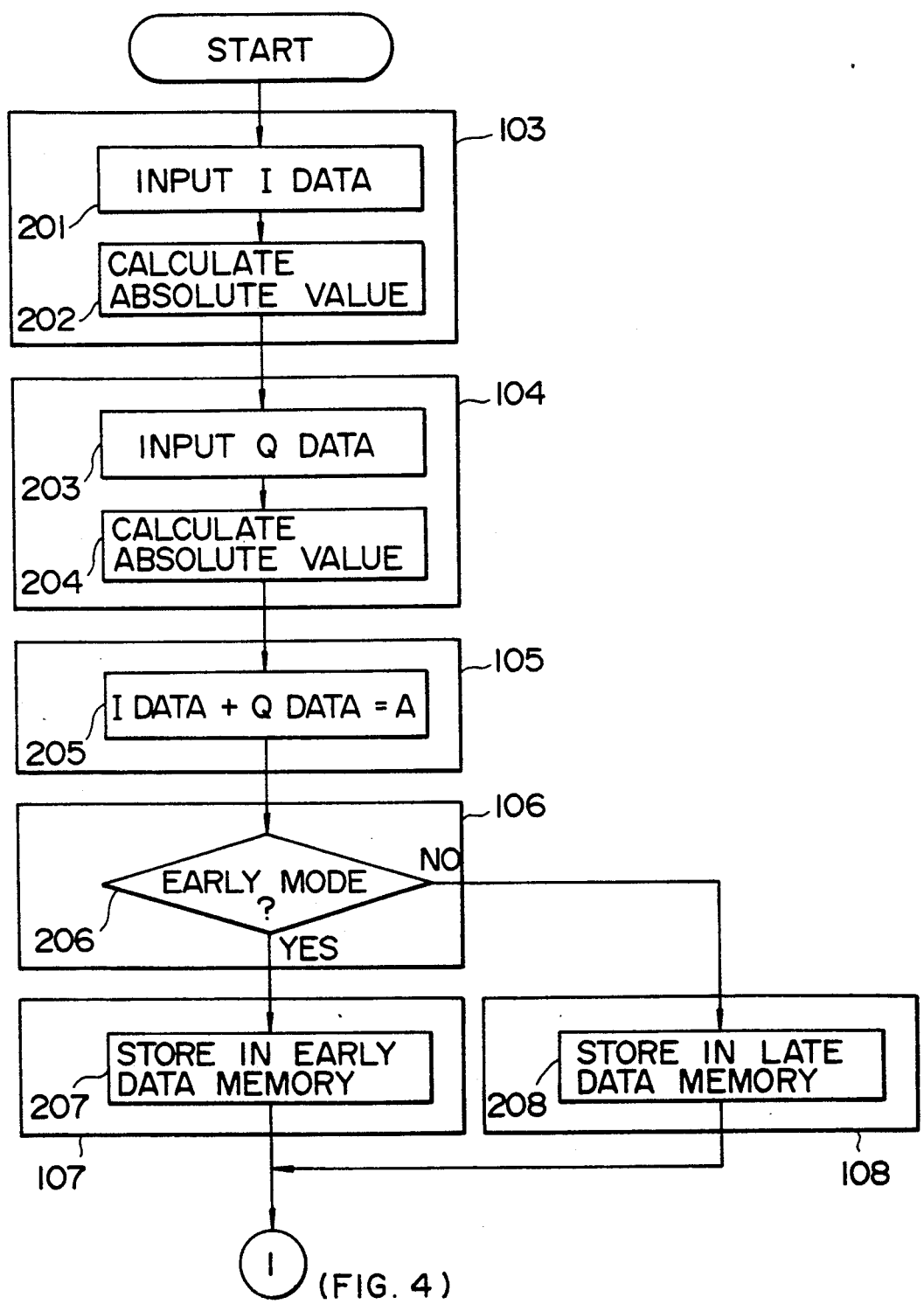
FIGS. 3 through 7 are flow charts sequentially showing the operation of a microcomputer employed in the embodiment of FIG. 1.

Referring first to FIG. 3, I data from the low-pass filter 64 of a counter constitution is inputted (step 201), and its absolute value is calculated (step 202). Similarly, Q data from the low-pass filter 65 of a counter constitution is inputted (step 203), and its absolute value is calculated (step 204).

Subsequently the absolute value of the I data calculated in step 202 and that of the Q data calculated in step 204 are added to each other to obtain a result A (step 205). And in accordance with the switching signal from the early/late switch 53, a decision is made as to whether the current operation mode is an early mode where the code generator 51 produces an early code Me (step 206). If the result of such decision signifies an early mode, the addition result A is written in the early data storage area of a RAM (step 207). In case the result of such decision signifies an early mode, the addition result A is written in the early data storage area of a RAM (step 207). In case the result of the decision signifies a late mode where the code generator 51 produces a late code Md, the addition result A is written in the late data storage area of the RAM (step 208).

Figure 4:
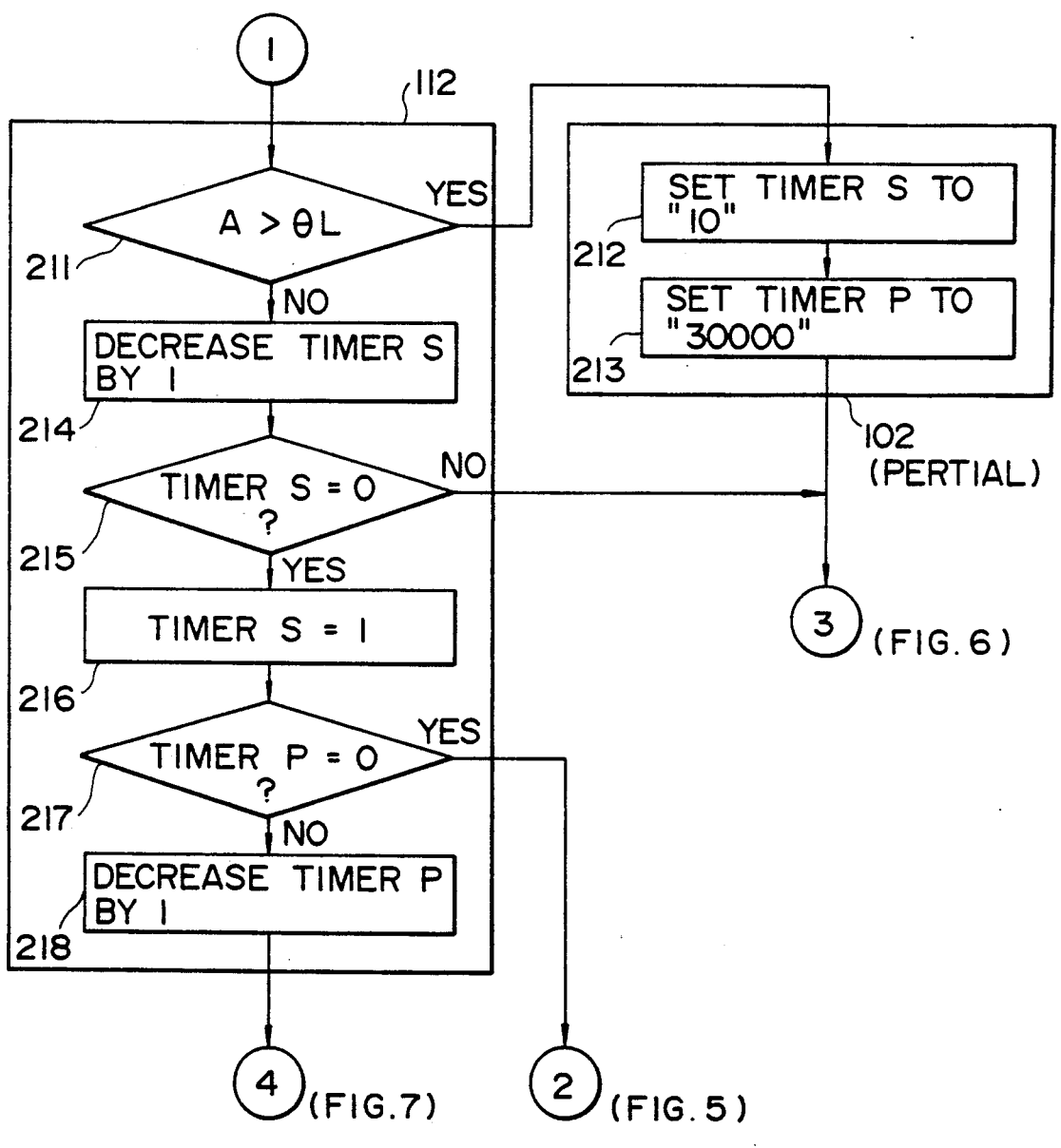

Thereafter the operation proceeds to the flow chart of FIG. 4. The partial procedure shown in FIG. 4 corresponds to the operation performed by the sync detecting means 112 in FIG. 1. More specifically, first a decision is made as to whether the addition result A obtained in step 205 is in excess of a predetermined threshold level or not (step 211). This decision is executed to find, with regard to the feedback loop 50, whether the predetermined correlation is attained or not between the pseudo-random noise code of the received signal and the pseudo-random noise code from the code generator 51.

Figure 6:
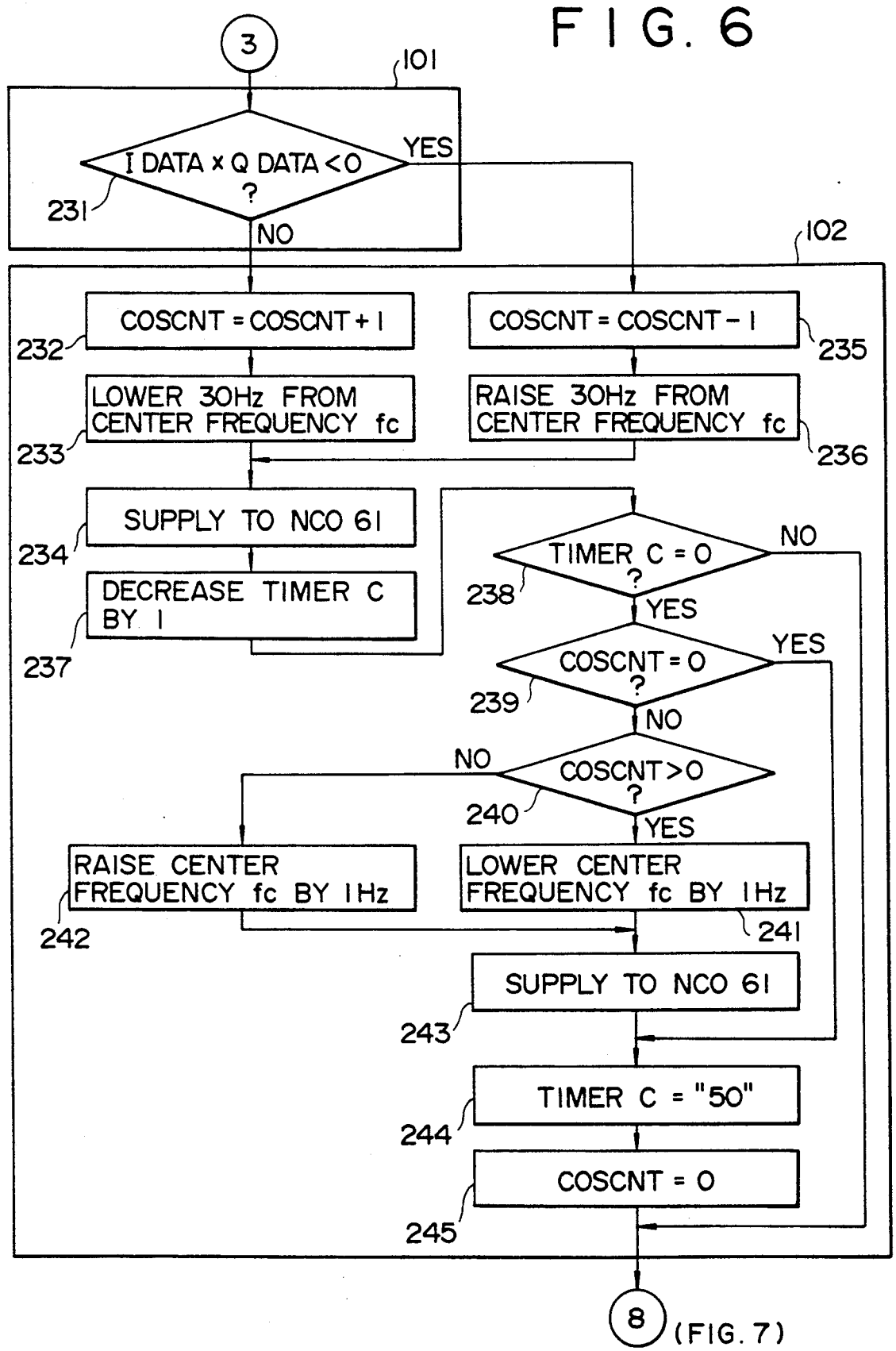

If the result of such decision signifies the attainment of the predetermined correlation, the first timer S is set to "10" (10 msec) (step 212) while the second timer P is set to "30000" (30 sec) (step 213), and then the operation proceeds to the flow chart of FIG. 6 for forming a control signal for the costas loop 60.

In case the result of the decision in step 211 signifies nonattainment of the predetermined correlation, the set value of the first timer S is increased by "1" (step 214), and a decision is made as to whether the value of the first timer S is "0" or not (step 215). If the result of such decision is negative to signify that the first timer S is not "0", the operation proceeds to the flow chart of FIG. 6.

When the result of the above decision signifies that the value of the first timer S is not "0", the timer S is set to "1" (step 216), and a decision is made as to whether the value of the second timer P is "0" or not (step 217). In case the value of the second timer P is "0", the operation proceeds to the flow chart of FIG. 5 relative to the search signal generating means 11 and the loop filter means 102 in a search mode. If the value of the second timer P is not "0", the value is decreased by "1" (step 218), and then the operation proceeds to the flow chart to FIG. 7 relative to the loop filter means 110 in the feedback loop 50.

In this case, if the attainment of the predetermined correlation is once detected (correlation lock) in the feedback loop 50, the first timer S so functions as not to determine non-correlation unless the result of the decision in step 211 signifies nonattainment of the predetermined correlation 10 times repeatedly, i.e., for 10 msec continuously in the flow chart of FIG. 4.

If the correlation locked state is once detected in the feedback loop 50, the second timer P is maintained in that state for a preset time of, e.g., 30 seconds despite the decision of non-correlation (signifying nonattainment of the predetermined correlation continuously for 10 msec). In this state, however, there are executed a control of the output of the carrier generator 61 by the loop filter 102 in the feedback loop 60 and also a control of the phase and frequency of the output of the clock generator 54 by the loop filter 110 in the feedback loop 50. In case the predetermined correlation is not attained even after the lapse of 30 seconds, the operation proceeds to the flow chart of FIG. 5 relative to a search for the correlation.

Once the correlation locked state is detected in the feedback loop 50, the correlation non-locked state is not determined immediately even though the result of the decision in step 211 signifies the nonattainment of the predetermined correlation, and the operation does not proceed immediately to a correlation search mode despite determination of the correlation non-lock. Therefore, even if the correlation non-lock is detected for a moment in a state where the proper correlationship is not lost practically, as in a case where any obstacle such as an airplane is temporarily present between the satellite and the receiving apparatus, the operation is prohibited from proceeding to the undermentioned correlation search which requires a relatively long time. Due to such contrivance, the feedback loop 50 is not affected substantially by the presence of any momentary interference to the reception, so that is becomes possible to ensure maintenance of the stable reception.

Now a description will be given on the flow chart of FIG. 5 relative to the search signal generating means 110 and the loop filter means 102 in a search mode.

The search in this embodiment is performed in the following manner. The received signal converted into an intermediate frequency signal Sif is within a range of 1.023 MHz±15 kHz. Therefore the predetermined correlation can be attained by searching such range. However, the band-width of the loop filter means 102 is generally in a frequency range narrower than such search range, i.e., ±350 Hz in this example, so that the search for the correlation is executable merely within the band-width of the loop filter means 102.

In this embodiment, therefore, the early and late codes from the code generator 51 are so controlled as to slide by one period at the center frequency fc corresponding to the output of the carrier generator 61. In case the predetermined correlation is not attained by such 1-period slide control, the oscillation center frequency fc of the carrier generator 61 is shifted by 700 Hz, and the slide control for the code generator 51 is executed again. Such control actions are performed sequentially in a range of ±15 kHz. In this procedure, changing the frequency fc by 700 Hz is executed in plus and minus directions alternately.

Figure 5:
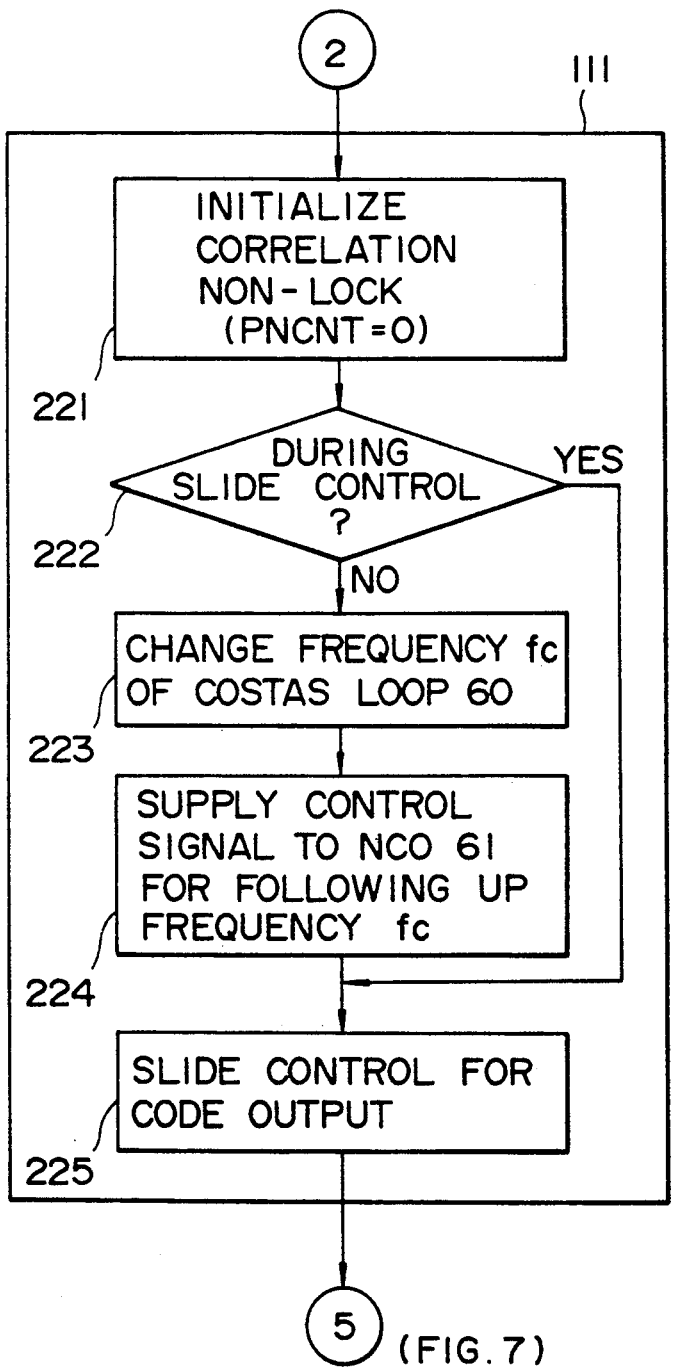

In FIG. 5, first the correlation non-locked state is initialized since the predetermined correlation is not attained in the feedback loop 50 (step 221). Subsequently a decision is made as to whether a 1-period slide (phase control) of the early and late codes from the code generator 51 has been completed or not (step 222). For example, a predetermined time of 4 seconds in this embodiment is required for execution of a correlation search by outputting the entire 1 period of the pseudo-random noise code from the code generator 51. Therefore the decision regarding completion of the 1-period slide is made by monitoring the 4-second timer.

When the result of the decision in step 222 indicates the lapse of 4 seconds, it signifies non-attainment of the predetermined correlation by the 1-period search of the output from the code generator 51. Therefore a numerical control signal is formed for changing the oscillation center frequency fc of the carrier generator (NCO) in the costas loop by a predetermined step width Δf=700 Hz step 223). And such numerical control signal is supplied to the carrier generator 61 (step 224). Thereafter a numerical control signal for sliding the output of the code generator 51 again by 1 period is formed and then is supplied to the clock generator 54 (step 225).

When the result of the decision in step 222 indicates no lapse of 4 seconds, it signifies that the 1-period slide of the output of the code generator 51 has not yet been completed. Accordingly the oscillation center frequency fc of the carrier generator 61 in the costas loop is left unchanged, and the operation proceeds to step 225 where a numerical control signal for sliding the output of the code generator 51 by 1 period is continuously supplied to the clock generator 54. After termination of step 225, the operation returns to step 201 in FIG. 3. (See FIG. 7)

As a result of the correlation search described above, a correlation locked state is detected somewhere with certainty.

Upon detection of attainment of the predetermined correlation in step 211 of FIG. 4, the operation proceeds to the flow chart of FIG. 6 relative to the loop filter means 102 for finely controlling the carrier generator 61. The oleration in this flow chart for controlling the carrier generator 61 in the correlation locked state is performed in the following manner.

First, the carrier generator 61 is set to the oscillation center frequency fc with attainment of the predetermined correlation. And in accordance with the output of the multiplying means 101 which is an error signal serving as a reference signal to control the carrier generator 61, the oscillation frequency of the carrier generator 61 is lowered by a predetermined frequency width of 30 Hz for example with respect to the center frequency fc when the multiplied output is positive (indicating that the oscillation frequency is deviated toward a higher side). To the contrary, when the multiplied output is negative (indicating that the oscillation frequency is deviated toward a lower side), the oscillation frequency of the carrier generator 61 is raised by a predetermined frequency width of 30 Hz for example with respect to the center frequency fc. Such frequency shift is executed per operation in this flow chart, i.e., every millisecond. The frequency shift is repeated for a time of, e.g., 50 milliseconds, and the number of positive multiplied outputs and that of negative multiplied outputs during 50 milliseconds are counted and compared with each other. Such operation may be performed by a single counter which counts up the positive outputs or counts down the negative outputs.

If the oscillation center frequency fc of the carrier generator 61 is locked to the carrier of the received signal, the counted value during 50 milliseconds is "0". Meanwhile, when the oscillation center frequency fc is higher than the lock frequency, the counted value becomes positive. And when the oscillation center frequency fc is lower than the lock frequency, the counted value becomes negative. Consequently, in case the counted value during 50 milliseconds is positive, the oscillation center frequency fc of the carrier generator 61 is shifted to be lower by a predetermined step width of 1 Hz or so, and the same operation is performed at the shifted oscillation center frequency fc. In case the counted value during 50 milliseconds is negative, the oscillation center frequency fc is shifted to be higher by a predetermined step width of 1 Hz or so, and the same operation is performed at the shifted oscillation center frequency fc. Due to the control described above, the oscillation center frequency fc of the carrier generator 61 is caused to exactly follow up the carrier of the received signal.

In the flow chart of FIG. 6, the counted values from the low-pass filters 64 and 65 are mutually multiplied, and a decision is made as to whether the multiplied output is negative or not (step 231). If the result of such decision signifies that the output is positive, the count COSCNT relative to the costas loop is increased by "1" (step 232), and a numerical control signal is formed for lowering the oscillation frequency of the carrier generator 61 by a predetermined frequency width of 30 Hz or so with respect to the center frequency fc at that instant (step 233). And such numerical control signal is supplied to the carrier generator 61 (step 234). If the result of the decision in step 231 signifies that the output is negative, the count COSCNT is decreased by "1" (step 235), and a numerical control signal is formed for raising the oscillation frequency of the carrier generator 61 by the aforesaid frequency width of 30 Hz with respect to the center frequency fc at that instant (step 236). And the numerical control signal thus produced is supplied to the carrier generator 61 (step 234).

Subsequently the value of the third timer C (initial value=50) is decreased by "1" (step 237). And a decision is made as to whether the value of the third timer C is "0" or not (step 238). If the result of such decision signifies that the value of the third timer C is not "0", it indicates that the predetermined time of 50 milliseconds has not elapsed yet after setting or changing the oscillation center frequency fc. Then the operation proceeds to the flow chart of FIG. 7.

In case the result of the decision in step 238 signifies that the value of the third timer C is "0", it indicates that the time of 50 milliseconds has elapsed already after setting or changing the oscillation center frequency fc. Then a decision is made as to whether the count COSCNT is "0" or not (step 239). And when the count COSCNT is "0", the oscillation center frequency fc is left unchanged, and the operation proceeds to step 244 where the third timer C is set to its initial value 50.

Meanwhile, if the count COSCNT is not "0", a decision is made as to whether the count COSCNT is positive or not (step 240). When the result of such decision signifies a positive value, a control signal for lowering the oscillation center frequency fc of the carrier generator 61 by 1 Hz is formed (step 241) and then is supplied to the carrier generator 61 (step 243).

Thereafter the operation proceeds to step 244 for initializing the third timer C, and further to step 245 where the count COSCNT is set to "0" for execution of the next counting action for 50 milliseconds. And the operation proceeds to the flow chart of FIG. 7.

Figure 7:
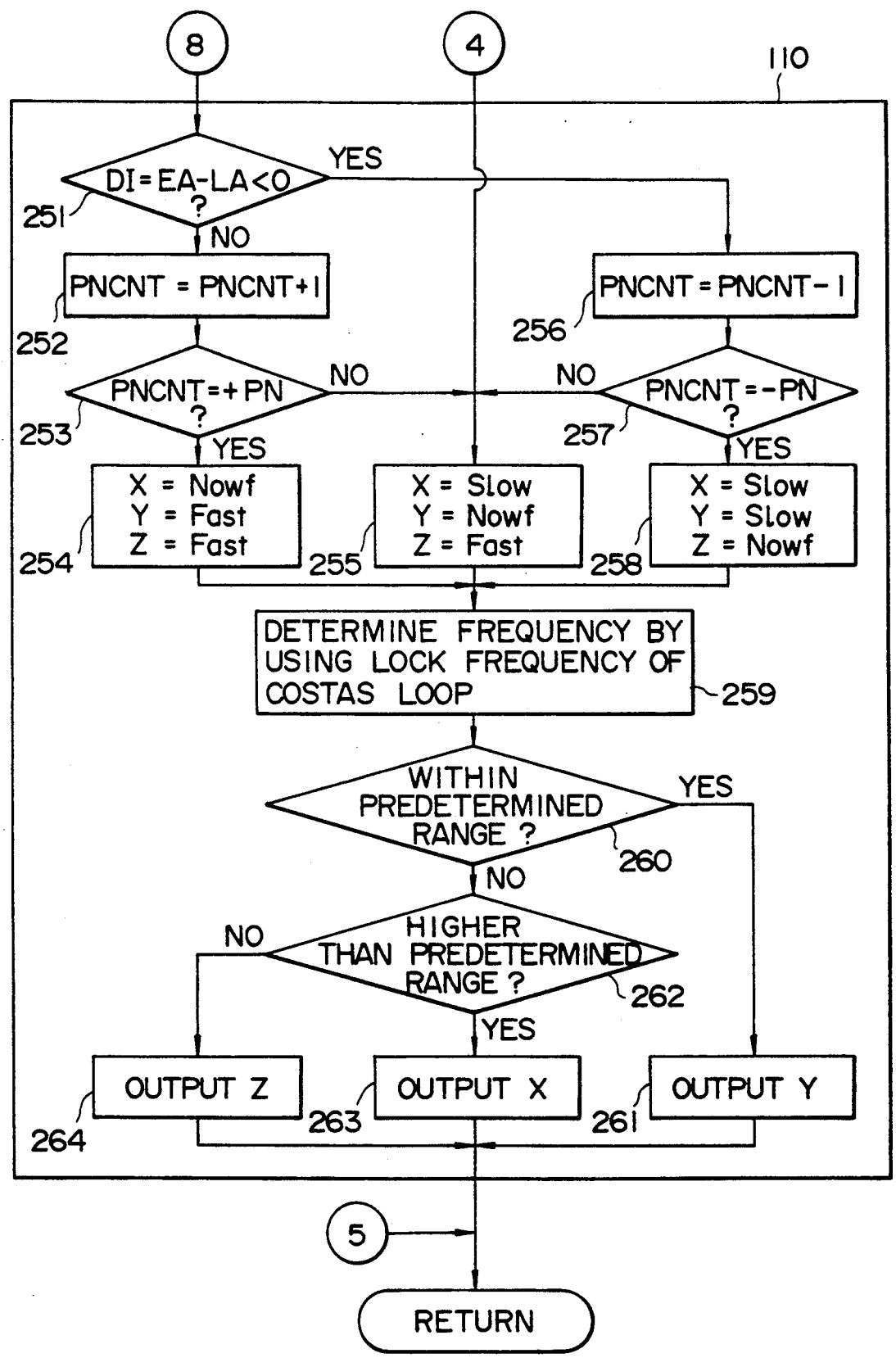

The flow chart of FIG. 7 shows the operation of the subtracting means 109 and the loop filter means 110. In this example, the code generator 51 is controlled in the following manner.

The difference DI between the early data EA and the late data LA outputted from the adding means 105 is calculated as DI=EA−LA. And when the difference DI is positive and greater than a predetermined value to indicate that the early code Me has a higher correlation level, the control action is so executed as to further advance the output phase of the code generator 51. Meanwhile, when the difference DI is negative and greater than the predetermined value to indicate that the late code Md has a higher correlation level, the control action is so executed as to delay the output of the code generator 51. If the difference DI is in a predetermined range with "0" at the center, the current state is maintained without any change.

Figure 8:
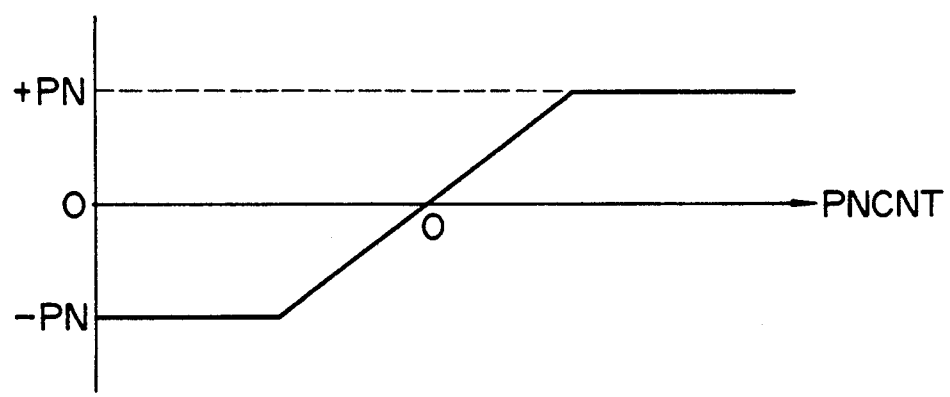
FIG. 8 is a diagram for explaining the principle of the operation in the flow chart of FIG. 7.

In the practical operation of FIG. 7, the difference DI in this example is represented by the count PNCNT of the counter concerned with control of the code generator 51. The aforesaid predetermined values are regarded as counts +PN and −PN and, as shown in FIG. 8, the count PNCNT is so preset as to become +PN when greater than the count +PN or to become −PN when smaller than the count −PN.

In addition to the above control, the chip speed (frequency) of the output code of the code generator 51 is checked on the basis of the output frequency of the carrier generator 61 in the costas loop 60. This check is performed by utilizing the existence of a predetermined relationship between the frequency of the carrier generator 61 and the output frequency of the clock generator 54 which serves as a driving circuit for the code generator 51. More specifically, the desired oscillation frequency of the carrier generator 61 in the costas loop 60 can be calculated when the feedback loop 50 is locked. Conversely, if the costas loop 60 is locked, the set frequency of the code generator 51 can be calculated from the resolution of the carrier generator 61 in the costas loop 60. Since the ratio of such two frequencies is 1:1500, it becomes possible to achieve a high-precision control of the frequency of the feedback loop 50 with an accuracy enhanced approximately 1500 times.

In the flow chart of FIG. 7, first the difference between the early data EA and the late data LA outputted from the adding means 105 is calculated, and a decision is made as to whether the difference EA−LA is negative or not (step 251). If the result of such decision signifies that the difference is positive, it indicates that the correlation level of the early code Me is higher, and therefore the count PNCNT is increased by "1" (step 252). And then a decision is made as to whether the count PNCNT is equal to the aforesaid predetermined value +PN or not (step 253). And three control output values X, Y and Z for the clock generator 54 are prepared in accordance with the results of such decision.

If the result of the decision in step 253 signifies that the count PNCNT is +PN, the control output X is set to a control value Nowf for maintaining the current output phase of the code generator 51 unchanged, while the control outputs X and Z are set to a control value Fast for the clock generator 54 to advance the output phase of the code generator 51 (step 54).

In case the result of the decision in step 253 signifies that the count PNCNT is not equal to PN, it indicates −PN<PNCNT<+PN. Therefore the control output X is set to a control value Slow for the clock generator 54 to delay the output phase of the code generator 51, while the control output Y is set to a control value Nowf to maintain the current state, and another control output Z is set to a control value Fast for the clock generator 54 to advance the output phase of the code generator 51 (step 255).

When the result of the decision in step 251 signifies that the difference DI is negative, the count PNCNT is decreased by "1" since the correlation level of the late code Md is higher (step 256). And a decision is made as to whether the count PNCNT is equal to the predetermined value −PN (step 257). If the result of the decision in step 257 signifies that the count PNCNT is equal to −PN, the control outputs X and Y are set to a control value Slow for the clock generator 54 to delay the output phase of the code generator 51, while another control output X is set to a control value Nowf for maintaining the current output phase of the code generator 51 (step 258). In case the result of the decision in step 257 signifies that the count PNCNT is not equal to −PN, it indicates −PN<PNCNT<+PN, so that the operation proceeds to step 255.

Subsequently the output frequency of the code generator 51 in the feedback loop 50 is calculated by using the output frequency of the carrier generator 61 in the costas loop 60, and a control value for the clock generator 54 with respect to such calculated output frequency is preset (step 258). The current control value for the clock generator 54 relative to the code generator 51 is compared with the control value thus preset, and a decision is made as to whether the difference therebetween is within a predetermined range or not (step 260). If the result of such decision signifies that the difference is within the predetermined range, the control value Y is selected for the clock generator 54 (step 261). Practically, in the case of −PN<PNCNT<+PN, the current state is maintained without any change. Meanwhile in the case of PNCNT = +PN, the control value Fast is selected for advancing the output phase of the code generator 51; and in the case of PNCNT = −PN, the control value Slow is selected for delaying the output phase of the code generator 51.

When the result of the decision in step 260 signifies that the aforesaid difference is beyond the predetermined range, a decision is made as to whether the frequency deviation is toward a higher side or not depending on the positive or negative of the difference (step 262). If the result of such decision signifies that the frequency deviation is toward a higher side, the aforementioned control output X is selected as the value for controlling the clock generator 54 (step 263). Practically, in the case of −PN<PNCNT<+PN or PNCNT = −PN, the control value Slow is selected for delaying the output phase of the code generator 51. Meanwhile in the case of PNCNT = +PN, the current output phase of the code generator 51 is maintained without any change.

If the result of the decision in step 262 signifies that the frequency deviation is toward a lower side, the control output Z is selected as the value for controlling the clock generator 54 (step 264). And in the case of −PN<PNCNT<+PN or PNCNT = +PN, the control value Fast is selected for advancing the output phase of the code generator 51. Meanwhile in the case of PNCNT = +PN, the output of the code generator 51 is maintained in the current state.

The operation shown in the flow charts of FIGS. 3 through 7 is repeated every millisecond.

It is to be understood that the present invention is not limited to the global positioning system (GPS) alone and may be applied also to any of spread spectrum signal receiving apparatus.

It is obvious that modulation of the carrier is not limited merely to the orthogonal phase modulation mentioned in the above embodiment, and a variety of modulation methods can be adopted as well. Furthermore, the data such as orbit parameters in the above embodiment need not exactly be superimposed on the carrier, and transmission of the carrier alone is also employable.

According to the present invention, as described hereinabove, a spread spectrum signal receiving apparatus can be constituted by the application of digital high-density integration and software to consequently realize low production cost, dimensional reduction, low power consumption and high quality.

Further according to the present invention equipped with a feedback loop for attaining a predetermined correlation between the pseudo-random noise code of a received signal and the output of a pseudo-random noise code generator, an intermediate frequency signal is encoded to be binary and is multiplied by the output of the pseudo-random noise code generator, whereby a balanced modulator employed in a conventional apparatus is no longer required to eventually eliminate the necessity of the circuit technique for retaining the balance of the modulator.

Moreover, the digital constitution enables the use of a numerical controlled oscillator (NCO) as a variable frequency oscillator without the need of a voltage controlled oscillator (VCO) employed customarily heretofore, whereby a merit is achievable in nonrequirement of the circuit technique to maintain the linearity of the voltage controlled oscillator.

In addition, stable reception is ensured without the necessity of any analog circuit technique due to the digital configuration described, so that when the present invention is applied to a multichannel receiving apparatus, there occurs neither interference nor variation between the channels. Besides the above, the parameters determined by the loop filter are changeable with facility by the application of software.

What is claimed is:

1. A spread spectrum signal receiving apparatus comprising:
   a radio frequency processing circuit for converting a spread spectrum signal into an intermediate frequency signal, the spread spectrum signal being such that a carrier thereof is modulated by a pseudo-random noise code;
   a binary encoder for binary-encoding the intermediate frequency signal supplied from the radio frequency processing circuit;
   a pseudo-random noise code generator for outputting a pseudo-random noise code;
   a code driver for controlling the phase and the frequency of the output pseudo-random noise code from the pseudo-random noise code generator;
   a first multiplier for multiplying the binary signal from the binary encoder by the output pseudo-random noise code obtained from the pseudo-random noise code generator to produce a corresponding output signal;
   a numerical controlled oscillator for outputting first and second carrier signals which have a $\pi/2$ phase difference from each other and follow up the frequency-converted carrier included in the intermediate frequency signal;
   second and third multipliers connected to the first multiplier and the numerical controlled oscillator for multiplying the output signal of the first multiplier, respectively, by the first and second carrier signals having a $\pi/2$ phase difference from each other to produce separate output signals;
   first and second low-pass filters consisting of counters and supplied with the output signals of the second and third multipliers, respectively; and
   a microcomputer for producing, in response to the count outputs of the second and third low-pass filters, control signals for controlling the numerical controlled oscillator in such a manner that the frequency and the phase of the output carrier signal of the numerical controlled oscillator follow up those of a carrier component included in the intermediate frequency signal, the microcomputer further producing, on the basis of the count outputs, control signals for controlling the code driver in such a manner that the phase of the output pseudo-random noise code from the pseudo-random noise code generator coincides with the phase of the pseudo-random noise code included in the spread spectrum signal.

2. A spread spectrum signal receiving apparatus as recited in claim 1, wherein:
   the microcomputer multiplies the output signals of the first and second low-pass filters together to produce a phase difference output signal which corresponds to the phase difference between a carrier component in the spread spectrum signal and the carriers obtained from the numerical controlled oscillator and then filters the phase difference output signal and supplies it as a control signal to the numerical controlled oscillator.

3. A spread spectrum signal receiving apparatus comprising:
- a radio frequency processing circuit for converting a spread spectrum signal into an intermediate frequency signal, the spread spectrum signal being such that a carrier thereof is modulated by a pseudo-random noise code;
- a binary encoder for binary-encoding the intermediate frequency signal supplied from the radio frequency processing circuit;
- a pseudo-random noise code generator for outputting a pseudo-random noise code;
- a code driver for controlling the phase and the frequency of the output pseudo-random noise code from the pseudo-random noise code generator;
- a first multiplier for multiplying the binary signal from the binary encoder by the output pseudo-random noise code obtained from the pseudo-random noise code generator to produce a corresponding output signal;
- a numerical controlled oscillator for outputting first and second carrier signals which have a $\pi/2$ phase difference from each other and follow up the frequency-converted carrier included in the intermediate frequency signal;
- second and third multipliers connected to the first multiplier and the numerical controlled oscillator for multiplying the output signal of the first multiplier, respectively, by the first and second carrier signals having a $\pi/2$ phase difference from each other to produce separate output signals;
- first and second low-pass filters consisting of counters and supplied with the output signals of the second and third multipliers, respectively, for producing separate count outputs;
- first and second absolute-value detecting means for detecting the absolute values of the count outputs of the second and third low-pass filters;
- an adding means for adding the outputs of the absolute-value detecting means to each other; and
- control means for producing, on the basis of the output of the adding means, control signals for controlling the code driver in such a manner that the phase of the output pseudo-random noise code from the pseudo-random noise code generator coincides with the phase of the pseudo-random noise code included in the received spread spectrum signal.

4. A spread spectrum signal receiving apparatus as recited in claim 3, wherein:
- the code driver supplied drive clock signal to the pseudo-random noise code generator;
- the control means further includes:
  - loop filter means supplied with the output of the adding means for forming a numerical control signal for controlling the phase of the of the drive clock signal;
  - search signal generating means supplied with the output of the adding means for generating a search signal for performing a search in such a manner as to cause the pseudo-random noise code generator to slide the pseudo-random noise code by one period until a predetermined correlation between the pseudo-random noise code from the pseudo-random noise code generator and the pseudo-random noise code in the spread spectrum signal is attained;
  - switching means for supplying one of the numerical control signal or the search signal to the code driver;
  - sync signal detecting means supplied with the output of the adding means for monitoring the output of the adding means and generating a switching signal to control the switching means to alternatively select the search signal or the numerical control signal.

5. A spread spectrum signal receiving apparatus as recited in claim 3, further comprising:
- means for multiplying the output signals of the first and second low-pass filters together to produce a phase difference output signal which corresponds to the phase difference between a carrier component in the spread spectrum signal and the carriers obtained from the numerical controlled oscillator; and
- means for filtering the phase difference output signal and supplying it as a control signal to the numerical controlled oscillator.

6. A spread spectrum signal receiving apparatus as recited in claim 4, further comprising:
- means for multiplying the output signals of the first and second low-pass filters together to produce a phase difference output signal which corresponds to the phase difference between a carrier component in the spread spectrum signal and the carriers obtained from the numerical controlled oscillator; and
- means for filtering the phase difference output signal and supplying it as a control signal to the numerical controlled oscillator.

* * * * *